May 30, 1933.  DE WITT VAN OSTRAND ET AL  1,911,934
HOLDER
Filed Sept. 25, 1931
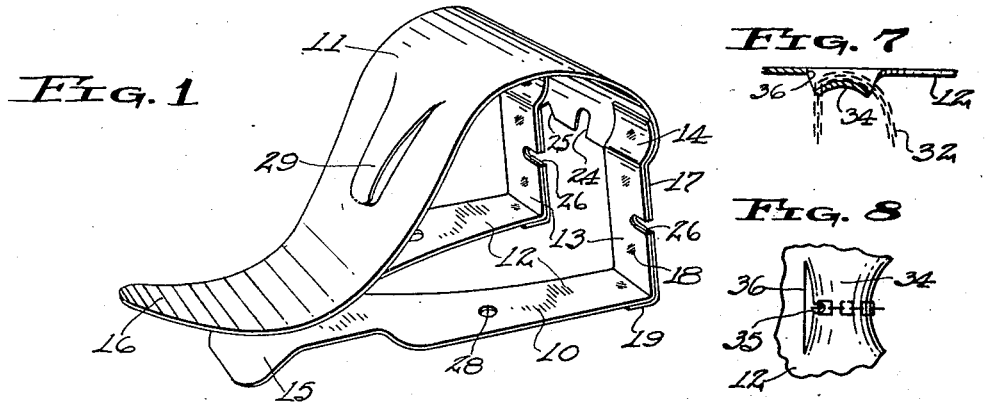
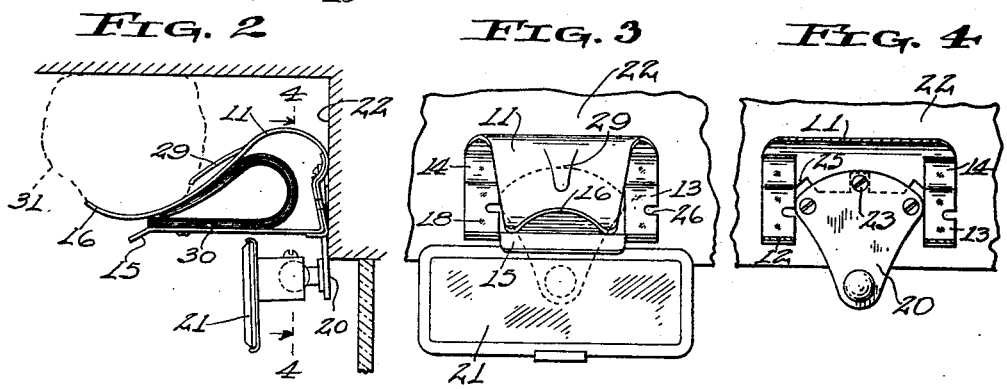
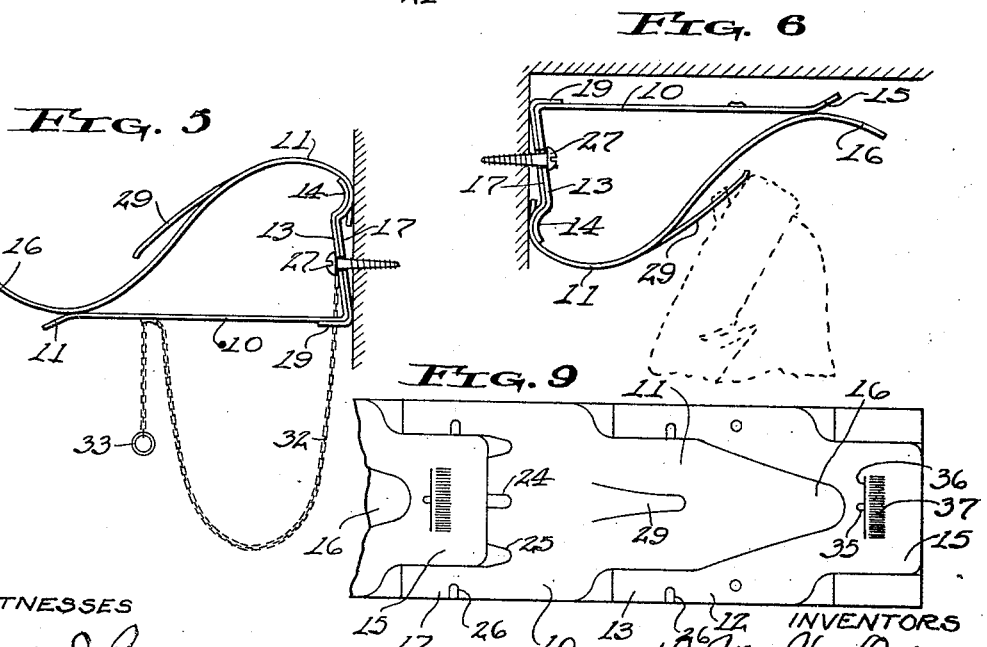

Patented May 30, 1933

1,911,934

UNITED STATES PATENT OFFICE

DE WITT VAN OSTRAND AND CLINTON VAN OSTRAND, OF PHILLIPS, WISCONSIN

HOLDER

Application filed September 25, 1931. Serial No. 565,065.

The invention relates to holders, and has for an object the provision of a sheet metal holder for a newspaper, magazine, road-map, or other article, and adapted for use in an automobile, the holder being so constructed that it can be readily secured in place by a fastening screw of a rear-view mirror bracket.

Another object of the invention is to provide a loop-shaped article holder having resilient free end portions adapted to receive an article therebetween and having an intermediate inwardly arched portion which receives fastening means therein, the tightening of the fastening means tending to straighten the arched portion for urging the free end portions together.

A further object of the invention is to provide a holder which can be economically stamped out of sheet metal and which includes a pair of body members having forked ends welded together in lapping relation to form an intermediate part of the holder.

A further object is to provide a holder including a package-supporting chain which is adjustably clamped in position.

The invention further consists in the several features hereinafter set forth and more particularly defined by the annexed claims.

In the accompanying drawing,

Fig. 1 is a perspective view of an article holder embodying the invention;

Fig. 2 is a side view of the holder as it appears when mounted at the rear-view mirror bracket of an automobile, parts of the automobile body being shown in section;

Fig. 3 is a front view of the holder in its mounted position;

Fig. 4 is a sectional view of the mounted holder taken along the line 4—4 of Fig. 2;

Fig. 5 is a side view of a modified form of holder including an article-holding chain;

Fig. 6 is a view of the holder mounted in an inverted position and forming a clothes hook;

Fig. 7 is a fragmentary sectional view of the chain-securing means of Fig. 5;

Fig. 8 is a fragmentary detail top view of the chain-securing means, and

Fig. 9 is a view showing the holder parts as they appear blanked out of a sheet metal strip.

In the drawing, the numerals 10 and 11 designate a pair of complementary resilient sheet metal body members which are secured together, as hereinafter described, to form a loop-shaped holder. The body member 10 is forked and substantially U-shaped and includes spaced flat legs 12 which are provided with angularly bent portions 13 having arcuately formed ends 14. The end of the flat portion of the body member 10 is provided with an angular lip 15 of reduced width. The body member 11 includes an S-shaped curved portion tapering to an end lip 16 which latter extends beyond the lip 15 and is divergent therefrom. At its other end, the body member 11 is forked to present spaced parallel strips 17 which are of the same width as the bent portions 13 of the body member 10. The parts 13 and 17 are secured together in lapping relation by spot welding 18, and the parts 17 preferably overlie the parts 13, so as to avoid shoulders at the curved outer side of the body member 11. The arcuate portions 14 of the body member 10 fit against the inner concave surface of the body member 11 and are spot welded thereto, and the strips 17 are provided with hooked ends 19 which are spot welded to the outer surfaces of the body member 10 adjacent the bent portions of the legs 12. The spot welded parts 13 and 17 are arched inwardly and the doubling of these parts provides reenforcement for the portion of the holder relied on for spring tension.

The spacing of the attached parts 13 and 17 of the holder permits them to straddle the bracket 20 of a rear-view mirror 21 of an automobile. This bracket is in its usual location adjacent the roof and windshield of an automobile and is secured to a vertical face 22 of the automobile body by screws 23. In the present instance, the bracket 20 and one or more of the screws 23 are used as the attaching means for the holder. The transverse edge of the body member 11 extending between the strips 17 is provided with a downwardly opening central screw-receiving notch 24 and downwardly opening side screw-receiving notches 25, the former and latter being used alternatively. To mount the holder, the screws 23 of the bracket 20 are loosened to permit the notched edge of the body member 11 to be inserted between the bracket and the vertical face 22, it being unnecessary to remove the screws. In the holder mounting illustrated, one of the screws 23 enters the central notch 24 of the holder. When the screws 23 are tightened, the holder will be firmly clamped in place between the bracket 20 and the adjacent vertical face 22. In some instances, the screws for the bracket may enter the side notches 25 of the holder. To permit of a still other type of attachment the edges of the welded parts 13 and 17 of the holders are provided with notches 26 which open laterally in the same direction to receive clamping screws 27 therein. In each case, the clamping pressure is applied to an inwardly arched portion of the holder, the holder engaging the vertical face 22 along spaced parallel lines of contact at opposite sides of the clamping screw or screws. The partial straightening of the inwardly arched portion under clamping pressure urges the resilient free end portions of the holder towards each other and preferably into contact when the holder is empty. The pressure between the free end portions of the holder can be adjusted by the clamping screw or screws.

In addition to the screw-receiving notches, the holder is provided in the legs 12 of the body member 10 with a pair of screw holes 28 which are for use in attaching the holder to a vertical support in the car. If the free ends of the holder face upwardly, the end lip 16 will serve as a clothes hook. The device may also be attached to an ordinary supporting post or wall for mail delivery purposes.

The body member 11 of the holder has struck out therefrom a tongue 29 which serves as a garment hook when the holder is mounted with the body member 11 downward, as seen in Fig. 6, or when the free ends of the holder are uppermost. The free end of the tongue 29 is preferably bent inwardly toward the body member.

As seen in Fig. 2, the holder may be used to support an article 30, such as a magazine, newspaper, or road-map, the resilient portions of the holder pressing against the article to retain it in place. In this case, the article is inserted by urging it between the divergent end lips 15 and 16 of the holder, the projecting lip 16 being moved upwardly by the article to facilitate entrance of the article. In some instances, a package or bundle 31 may be retained between the roof of the automobile and the curved body member 11 of the holder, as indicated in dotted lines in Fig. 2. In the latter case, the spring tension on the body member 11 may be increased by forcing an object between the body members.

If additional carrying capacity is desired, a suspended chain 32 or the like is secured at one end to one of the attaching screws, and at its other end is provided with a ring 33. An intermediate bight of the chain is supported over a rounded portion 34 pressed out from the body member 10, a notch 35 being provided in the rounded portion 34 to receive the chain and to permit the chain to be locked or wedged in adjusted position. One side of the rounded portion 34 is formed by a transverse slit 36 in the body member 10. A package is inserted between the body member 10 and the suspended bight of the chain 32 and is retained in position by pulling the chain thereagainst.

As seen in Fig. 9, the sheet metal parts of the holder can be economically blanked out from a strip of sheet metal, the material cut out between the legs of the U-shaped body member 10 forming the tapered end of the body member 11, and the material cut out between the spaced strips 17 of the body member 11 forming the lip 15 of the body member 10. A series of parallel corrugations or scores 37 are formed on the outer surface of the body member 10 to present a match-scratching surface. Both of the body members of the holder have outer surfaces on which a considerable amount of advertising matter can be placed, if desired, and when the holders are to be shipped, it is possible to nest several one within the other by reason of their resilient character, thus reducing shipping costs.

What we claim as new and desire to secure by Letters Patent is:

1. An article holder comprising a resilient sheet metal loop having a pair of tongues with divergent free end portions adapted to receive an article therebetween and having an intermediate transverse attaching portion engageable with a support, said attaching portion and one of said tongues having a connecting opening adapted to receive a clamping member therein engageable with the inner face of said attaching portion, there being a screw-receiving notch in said attaching portion communicating with said opening.

2. An article holder comprising a resilient sheet metal loop having an intermediate attaching portion and a pair of tongues having free end portions adapted to receive an article therebetween, a chain having one end fastened to said loop adjacent said attaching portion, one of said tongues having a supporting surface slidably receiving said chain, said chain forming a suspended article-clamping bight between its fastening point and said supporting surface, and means for releasably securing said chain on said supporting surface.

In testimony whereof we affix our signatures.

DE WITT VAN OSTRAND.
CLINTON VAN OSTRAND.